United States Patent [19]

Nakajima et al.

[11] Patent Number: 4,652,619
[45] Date of Patent: Mar. 24, 1987

[54] EPOXY IMPREGNATING RESIN COMPOSITION

[75] Inventors: Hiroyuki Nakajima, Suita; Fumiyuki Miyamoto, Itami; Masakazu Murayama, Takatsuki; Eiki Jidai, Toyonaka, all of Japan

[73] Assignee: Mitsubishi Denki Kabushiki Kaisha, Tokyo, Japan

[21] Appl. No.: 617,519

[22] Filed: Jun. 5, 1984

[30] Foreign Application Priority Data

Jul. 26, 1983 [JP] Japan ................................ 58-138214

[51] Int. Cl.$^4$ ................................................ C08G 8/30
[52] U.S. Cl. ..................................... 525/502; 525/507; 525/529
[58] Field of Search ......................... 525/529, 502, 507

[56] References Cited

U.S. PATENT DOCUMENTS

| | | | |
|---|---|---|---|
| 3,888,942 | 6/1975 | Tsen | 525/930 |
| 3,940,537 | 2/1976 | Burns | 525/529 |
| 4,042,566 | 8/1977 | Murphy | 525/529 |
| 4,060,656 | 11/1977 | Naka et al. | 525/451 |
| 4,393,165 | 7/1983 | Sasaki et al. | 525/529 |
| 4,410,680 | 10/1983 | Brownscombe et al. | 525/529 |

FOREIGN PATENT DOCUMENTS

| | | | |
|---|---|---|---|
| 704314 | 2/1965 | Canada | 525/529 |
| 750975 | 1/1967 | Canada | 525/529 |
| 93417 | 5/1974 | Japan | 525/529 |

Primary Examiner—John C. Bleutge
Assistant Examiner—Robert E. L. Sellers, II
Attorney, Agent, or Firm—Oblon, Fisher, Spivak, McClelland & Maier

[57] ABSTRACT

An epoxy impregnating resin composition comprising 100 parts by weight of a compound having at least two epoxy groups in one molecule, from 0.1 to 100 parts by weight of an allyl epoxy compound having both allyl and epoxy groups in one molecule and represented by the general formula:

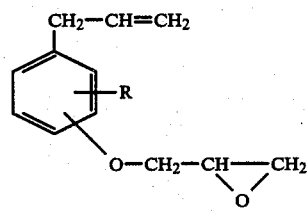

where R is hydrogen, halogen or a monovalent organic group, from 30 to 300 parts by weight of a liquid cyclic acid anhydride, and from 5 to 300 parts by weight of a compound having a polymerizable double bond.

8 Claims, No Drawings

EPOXY IMPREGNATING RESIN COMPOSITION

The present invention relates to a novel low viscosity epoxy impregnating resin composition. More particularly, it relates to a low viscosity epoxy impregnating resin composition having a long pot life and excellent properties such as mechanical and electrical properties, which is prepared by incorporating an allyl epoxy and vinyl monomers to an epoxy compound.

A number of patent applications have been made with respect to epoxy impregnating resins, and various epoxy-type impregnating resins have been practically applied to various equipments and instruments. However, most of these epoxy impregnating resins are highly viscous at room temperature, and their pot life is relatively short in many cases. To reduce the viscosity, it is common to incorporate a diluent to the resin. However, most of usual diluents present substantial irritation to the skin, and they tend to impair the physical properties of the resin in many cases. Thus, there has been no epoxy impregnating resin which has fully satisfactory characteristics.

Under these circumstances, the present inventors have conducted extensive researches to develop an epoxy impregnating resin which is free from the above-mentioned drawbacks. As a result, they have found that it is possible to obtain an epoxy impregnating resin composition having a low viscosity and a long pot life and being capable of providing excellent curing characteristics, by incorporating from 0.1 to 100 parts by weight of an allyl epoxy compound of the formula I, a liquid cyclic acid anhydride and from 5 to 300 parts by weight of a compound having a polymerizable double bond, to 100 parts by weight of an epoxy compound having at least two epoxy groups in one molecule. The present invention is based on this discovery.

Thus, the present invention provides an epoxy impregnating resin composition comprising 100 parts by weight of a compound having at least two epoxy groups in one molecule, from 0.1 to 100 parts by weight of an allyl epoxy compound having both allyl and epoxy groups in one molecule and represented by the general formula:

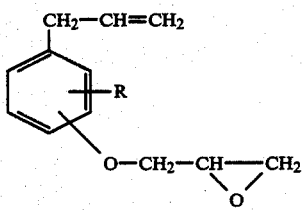

where R is hydrogen, halogen or a monovalent organic group, from 30 to 300 parts by weight of a liquid cyclic acid anhydride, and from 5 to 300 parts by weight of a compound having a polymerizable double bond.

Now, the present invention will be described in detail with reference to the preferred embodiments.

The feature of the present invention resides in that the viscosity of the composition is lowered by employing the allyl epoxy compound having low toxicity and low viscosity, and the allyl epoxy compound is present as a component which is capable of reacting with both the epoxy compound and the acid anhydride and vinyl monomer in the reaction system to form a uniform network by virtue of the vinyl and epoxy groups both contained in the allyl epoxy compound, whereby the properties of the cured product can be improved.

The epoxy compound to be used in the present invention, may be any epoxy compound so long as it has at least two epoxy groups in one molecule. For instance, there may be mentioned a bisphenol A glycidyl ester type epoxy compound such as DER 332 (trade name by Dow Chemical Co.), Epikote 828 (trade name by Shell Oil Co.) or GY-255 (trade name by Ciba Geigy Corp.); a novolac type epoxy compound such as DEN 431 (trade name by Dow Chemical Co.); and an cycloaliphatic type epoxy compound such as CY-179 (trade name by Ciba Geigy Corp.). These epoxy compounds may be used alone or in combination as a mixture.

As the liquid cyclic acid anhydride to be used in the present invention, there may be mentioned methyltetrahydrophthalic anhydride [HN-2200 (trade name by Hitachi Chemical Co. Ltd.)], methylhexahydrophthalic acid anhydride [HN-5500 (trade name by Hitachi Chemical Co., Ltd.)] and methyl endomethylenehexahydrophthalic anhydride [Anhydrous Methyl Hymic Acid (trade name by Hitachi Chemical Co., Ltd.)].

As the compound having a polymerizable double bond to be used in the present invention, there may be mentioned styrene, vinyltoluene, divinylbenzene, a diacrylate, a dimethacrylate, trimethylolpropanetriacrylate, trihydroxyethylisocyanurate triacrylate, trihydroxyethylisocyanurate trimethacrylate, triallyltrimellitate and triallylisocyanurate.

The amount of the allyl epoxy compound to be incorporated, is from 0.1 to 100 parts by weight relative to 100 parts by weight of the epoxy compound. If the amount is less than 0.1 part by weight, the crosslinking of the epoxy component with the vinyl component tends to be insufficient, and no adequate effectiveness will be obtained. On the other hand, if the amount exceeds 100 parts by weight, the intrinsic nature of the allyl epoxy compound tends to appear distinctly, thus leading to the deterioration of the properties of the composition such as a decrease of the mechanical strength or deterioration of the electrical properties.

The compound having a polymerizable double bond is incorporated in an amount of from 5 to 300 parts by weight relative to 100 parts by weight of the epoxy compound. If the amount is less than 5 parts by weight, no adequate effectiveness of the incorporation (such as no adequate reduction of the viscosity) will be obtained. On the other hand, if the amount exceeds 300 parts by weight, the shrinking rate tends to be too great, whereby the properties as a resin will be deteriorated.

Further, from the viewpoint of imparting flexibility to the resin, it is effective to incorporate a phenoxy resin. For this purpose, a phenoxy resin having a molecular weight of from 10,000 to 50,000 may be incorporated in an amount not exceeding 10 parts by weight.

Furthermore, for the purpose of reducing the viscosity of the composition, a compound having one epoxy group in its molecule, such as phenyl glycidyl ether, cresyl glycidyl ether or p-t-butylphenyl glycidyl ether, may also be incorporated in an amount not exceeding 10 parts by weight, as the case requires. If the amount exceeds 10 parts by weight, the viscosity tends to increase to an impractical level.

It is effective to incorporate a catalyst for the purpose of promoting the reaction of the composition.

As a catalyst for promoting the reaction of the epoxy compound, there may be mentioned an organic metal salt such as cobalt acetylacetate, zinc octylate or tin octylate; an imidazole; or a Lewis acid such as $BF_3$ or $BCl_3$.

Further, the curing of the composition may be promoted by incorporating a vinyl polymerization catalyst, for instance, a peroxide such as dicumyl peroxide or benzoyl peroxide, or azobisisobutyronitrile.

In the present invention, when an alicyclic epoxy compound such as 3,4-epoxycyclohexyl methyl-3',4'-epoxy cyclohexane carboxylate, 3,4-epoxy-6-methylcyclohexyl methyl-3'4'-epoxy-6'-methylcyclohexane carboxylate, vinyl cyclohexene dioxide, dicyclopentadiene dioxide or dipentene dioxide, is employed, it is possible to obtain a composition having a satisfactory pot life by using a metal salt of an organic carboxylic acid such as zinc octylate as the catalyst for the epoxy reaction. In this case, it is preferred that from 0.01 to 5.0 parts by weight of the catalyst relative to 100 parts by weight of the alicyclic epoxy compound, is preliminarily heat-treated at a temperature of from 100° to 150° C. for from 10 to 120 minutes. The alicyclic epoxy compound containing the catalyst thus obtained, exhibits a long pot life as compared with the catalyst system without the heat treatment.

The epoxy impregnating resin compositions of the present invention obtained as mentioned above, have a low visocosity and superior impregnating properties, and yet they provide cured products having excellent electrical and mechanical properties.

Now, the present invention will be described in further detail with reference to Examples. However, it should be understood that the present invention is by no means restricted by these specific Examples.

EXAMPLE 1

To 80 parts by weight of Epikote 828 (manufactured by Shell Oil Co.) as an epoxy compound, 20 parts by weight of 2-allylphenylglycidyl ether, 20 parts by weight of trimethylolpropane triacrylate, 20 parts by weight of styrene and 80 parts by weight of methyltetrahydrophthalic anhydride were added, and 0.05 parts by weight of dicumyl peroxide and 0.5 part by weight of zinc octylate as catalysts were added to obtain an epoxy impregnating resin. This resin had an initial viscosity of 50 centipoise at 25° C.

The pot life of the impregnating resin was investigated by leaving it to stand in a constant temperature and humidity container kept at a temperature of 25° C. under a relative humidity of 35% and measuring the viscosity periodically. Namely, in this investigation, the number of days until the viscosity at 25° C. reached 400 centipoise, were taken as the pot life. As the result, this impregnating resin was found to have a pot life of at least 6 months.

Then, this resin was heated at 110° C. for 6 hours and then cured at 150° C. for 16 hours, whereby a cured product was obtained. The bending strength of this cured product was 11 kg/mm² at 25° C., and the weight reduction by the heating at 200° C. for 16 days was as low as 1.0%, thus indicating a satisfactory characteristic (according to JIS C-2103). The dielectric loss tangent of this product was not higher than 1% at 100° C., thus indicating a satisfactory characteristic (according to JIS C-2103). In the skin irritation test, no change was observed on the skin.

EXAMPLE 2

To 100 parts by weight of GY-255 (Ciba Ltd.) as an epoxy compound, 0.1 part by weight of 2-allylphenylglycidyl ether, 20 parts by weight of trihydroxyethylisocyanurate triacrylate, 20 parts by weight of styrene and 90 parts by weight of methyl endomethylene tetrahydrophthalic anhydride were added, and 0.1 part by weight of dicumylperoxide and 0.3 part by weight of cobalt acetyl acetate as catalysts were incorporated to obtain an epoxy impregnating resin. This resin had an initial viscosity of 60 centipoise at 25° C.

The pot life of the impregnating resin was measured in the same manner as in Example 1, whereby the resin was found to have a pot life of at least 6 months, as the number of days until the viscosity at 25° C. reached 400 centipoise.

Then, this resin was heated at 120° C. for 6 hours and then cured at 150° C. for 16 hours, whereby a cured product was obtained. The bending strength of this cured product was 12 kg/mm² at 25° C., and the weight reduction by the heating at 200° for 16 days was as low as 1.2%, thus indicating a satisfactory characteristic (according to JIS C-2103). The dielectric loss tangent of this product was not higher than 1% at 100° C., thus indicating a satisfactory characteristic (according to JIS C-2103).

EXAMPLE 3

To 100 parts by weight of GY-255 (manufactured by Ciba Ltd.) as an epoxy compound, 0.1 part by weight of a phenoxy resin having a molecular weight of about 30,000, 3 parts by weight of 4-methyl-2-allylphenylglycidyl ether, 10 parts by weight of trihydroxyether isocyanurate trimethacrylate, 10 parts by weight of triallyltrimellitate, 5 parts by weight of vinyl toluene and 88 parts by weight of methylhexahydrophthalic anhydride, were added, and 0.2 part by weight of dicumylperoxide and 0.5 part by weight of a $BF_3$-monoethylamine complex as catalysts were incorporated to obtain an epoxy impregnating resin. This resin had an initial viscosity of 60 centipoise at 25° C.

The pot life of this impregnating resin was measured in the same manner as in Example 1, whereby it was found to have a pot life of at least 6 months as the number of days until the viscosity reached 400 centipoise.

Then, this resin was heated at 110° C. for 6 hours, and then cured at 160° C. for 16 hours, whereby a cured product was obtained. The bending strength of this cured product was 12.5 kg/mm² at 25° C. and weight reduction by the heating at 200° C. for 16 days was as low as 0.8%, thus indicating a satisfactory characteristic (according to JIS C-2103). The dielectric loss tangent of this product was not higher than 1% at 100° C., thus indicating a satisfactory characteristic (according to JIS C-2103).

EXAMPLE 4

To 100 parts by weight of DER 332 (manufactured by Dow Chemical Co.) as an epoxy compound, 1.0 part by weight of a phenoxy resin having a molecular weight of about 30,000, 5 parts by weight of 2-allylphenylglcidyl ether, 30 parts by weight of trihydroxyethylisocyanurate triacrylate, 5 parts by weight of triallylisocyanurate and 90 parts by weight of methyltetrahydrophthalic anhydride, were added, and 0.1 part by weight of benzoyl peroxide and 0.3 part by weight of zinc octylate as catalysts, were incorporated to obtain an epoxy impregnating resin. This resin had an initial viscosity of 70 centipoise at 25° C.

The pot life of this impregnating resin was measured in the same manner as in Example 1, whereby it was found to have a pot life of at least 6 months as the number of days until the viscosity reached 400 centipoise.

Then, this resin was heat-treated at 120° C. for 6 hours and then cured at 150° C. for 16 hours, whereby a cured product was obtained. The bending strength of this cured product was 11 kg/mm$^2$ at 25° C., and the weight reduction by the heating at 200° C. for 16 days was as low as 1.0%, thus indicating a satisfactory characteristic (according to JIS C-2103). The dielectric loss tangent of this product was not higher than 1% at 100° C., thus indicating a satisfactory characteristic (according to JIS C-2103).

EXAMPLE 5

To 10 parts by weight of an alicyclic epoxy compound, 0.05 part by weight of zinc octylate was added and heat-treated at a temperature of 120° C. for 30 minutes. The mixture was cooled to 25° C., and 90 parts by weight of DER-332 (manufactured by Dow Chemical Co.), 0.1 part by weight of a phenoxy resin having a molecular weight of about 30,000, 5 parts by weight of 2-allylphenylglycidyl ether, 30 parts by weight of trishydroxyethylisocyanurate triacrylate, 90 parts by weight of methyltetrahydrophthalic anhydride and 0.2 part by weight of dicumyl peroxide, were added to obtain an epoxy impregnating resin. This resin had an initial viscosity of 60 centipoise at 25° C.

The pot life of the resin was measured in the same manner as in Example 1, whereby it was found to have a pot life of at least 6 months.

Then, this resin was heat-treated at 120° C. for 6 hours, and then cured at 160° C. for 16 hours, whereby a cured product was obtained. The bending strength of this cured product was 12 kg/mm$^2$ at 25° C., and the weight reduction by the heating at 200° C. for 16 days was as low as 1.2%, thus indicating a satisfactory characteristic (JIS C-2103). The dielectric loss tangent of this product was not higher than 1% at 100° C., thus indicating a satisfactory characteristic (according to JIS C-2103).

EXAMPLE 6

To 65 parts by weight of the above-mentioned CY-179 as the alicyclic epoxy compound, 15 parts by weight of p-t-butylphenylglycidyl ether and 0.2 part by weight of zinc octylate were added, and the mixture was heat-treated at 120° C. for 30 minutes, and after cooling it to 25° C., 10 parts by weight of 2-allylphenylglycidyl ether, 10 parts of trimethylolpropane triacrylate and 0.5 part of dicumyl peroxide were added thereto. Further, 85 parts by weight of HN-2200 was added thereto to obtain an epoxy impregnating resin. The viscosity of the resin was 100 centipoise at 25° C.

The pot life of the impregnating resin was investigated by leaving it to stand in a constant temperature and humidity container kept at a temperature of 25° C. under a relative humidity of 35% and measuring the viscosity periodically. Namely, in this investigation, the number of days until the viscosity at 25° C. reached 400 centipoise, were taken as the pot life. As the result, this impregnating resin was found to have a pot life of at least 6 months, thus indicating a satisfactory characteristic.

This resin was subjected to curing at 150° C. for 16 hours, whereby a cured product was obtained.

The bending strength of this cured product was 11 kg/mm$^2$ at 25° C., and the weight reduction by the heating at 200° C. for 16 days was as low as 3.0%, thus indicating a satisfactory characteristic (according to JIS C2103). This product was subjected to a skin irritation test, whereby no change on the skin was observed.

EXAMPLE 7

By using the same composition as in Example 6, an epoxy impregnating resin was prepared in the same manner as in Example 6 except that the heat treatment of zinc octylate was conducted at a temperature of 100° C. for 30 minutes. From the measurement of the pot life in the same manner as in Example 6, the resin was found to have a pot life of at least 6 months.

Further, the resin cured under the same curing conditions as in Example 6, showed the substantially the same satisfactory characteristics as the resin in Example 6.

EXAMPLE 8

By using the same composition as in Exmaple 6, an epoxy impregnating resin was prepared in the same manner as in Example 6 except that the heat treatment of zinc octylate was conducted at a temperature of 140° C. for 30 minutes. From the pot life test conducted in the same manner as in Example 6, this resin was found to have a pot life of at least 6 months.

Further, the resin cured under the same curing conditions as in Example 6 showed substantially the same satisfactory characteristics as the resin of Example 6.

EXAMPLE 9

To 60 parts by weight of the alicyclic epoxy compound, 10 parts by weight of GY-255 (trade name for a bisphenol A type epoxy compound, manufactured by Ciba Ltd.) and 0.2 part by weight of zinc octylate were added, and the mixture was heat-treated at 130° C. for 30 minutes. Then, 15 parts by weight of 4-methyl-2-allylphenylglycidyl ether, 15 parts by weight of trimethylolpropane triacrylate, 0.5 part by weight of di-tert-butyl hydroperoxide and 98 parts by weight of HN-5500 were added thereto to obtain an epoxy impregnating resin.

The initial viscosity of this impregnating resin was 130 centipoise at 25° C. Further, from the pot life test conducted in the same manner as in Example 6, it was found to have a pot life of at least 6 months.

This resin was cured at 150° C. for 16 hours, whereby a cured product was obtained.

The bending strength of this cured product was 10.5 kg/mm$^2$ at 25° C., and the weight reduction by the heating at 200° C. for 16 days was as low as 3.9%, thus indicating a satisfactory characteristic (according to JIS C-2103).

COMPARATIVE EXAMPLE 1

An epoxy impregnating resin was prepared in the same manner as in Example 6 by using the same composition as used in Example 6 except that no zinc octylate catalyst was added. The initial viscosity was the same as in Example 6. However, the pot life was found to be as short as 1.5 months.

COMPARATIVE EXAMPLE 2

An epoxy impregnating resin was prepared in the same manner as in Example 6 by using the same composition as used in Example 6 except that the heat treatment of zinc octylate was conducted at 80° C. for 30 minutes. The initial viscosity was the same as in Example 6. However, the pot life was found to be as short as 1.5 months.

COMPARATIVE EXAMPLE 3

An epoxy impregnating resin was prepared in the same manner as in Example 6 except that 2-allylphenylglycidyl ether and trimethylolpropane triacrylate were substituted for cresyl glycidyl ether.

The viscosity of this resin was 90 centipoise at 25° C.

This impregnating resin showed a pot life of at least 3 months. However, with respect to the properties after the curing at 150° C. for 16 hours, the bending strength was as low as 8 kg/mm$^2$ and the weight reduction by the heating at 200° C. for 16 days was as great as 65%, thus showing poor curing characteristics.

Having thus described the present invention, it should be understood that according to the present invention, it is possible to obtain a low viscosity epoxy resin having a long pot life and good curing characteristics.

We claim:

1. An epoxy impregnating resin composition, comprising:
   (a) 100 parts by weight of a compound having at least two epoxy groups in one molecule;
   (b) from 0.1 to 100 parts by weight of an allyl epoxy compound having both allyl and epoxy groups in one molecule and represented by the formula:

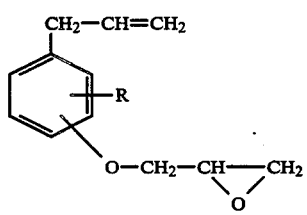

wherein R is hydrogen, halogen or a monovalent organic group;
   (c) from 30 to 300 parts by weight of a liquid cyclic acid anhydride;
   (d) from 0.1 to 10 parts by weight of a phenoxy resin having a molecular weight of from 10,000 to 50,000; and
   (e) from 5 to 300 parts by weight of a compound having three polymerizable double bonds.

2. The epoxy impregnating resin composition according to claim 1, wherein the compound having at least two epoxy groups in one molecule is a bisphenol A type epoxy compound, a novolac type epoxy compound or an cycloaliphatic type epoxy compound.

3. The epoxy impregnating resin composition according to claim 2, wherein the cycloaliphatic type epoxy compound employed is preliminarily heat-treated with an organic metal salt catalyst at a temperature of from 100 to 150° C.

4. The epoxy impregnating resin composition of claim 1, wherein said composition further comprises not more than 300 parts by weight of a compound having not more than two polymerizable double bonds therein.

5. The epoxy impregnating resin composition according to claim 1, wherein said composition further comprises, as a viscosity reducing agent, up to 10 parts by weight of a compound having one epoxy group in its molecule.

6. The epoxy impregnating resin composition according to claim 1, wherein said compound having three polymerizable double bonds is a compound selected from the group consisting of trimethylolpropane triacrylate, trihydroxyethylisocyanurate triacrylate, trihydroxyethylisocyanurate trimethacrylate, triallyltrimellitate and triallylisocyanurate.

7. The epoxy impregnating resin composition according to claim 1, wherein said liquid cyclic acid anhydride is methyltetrahydrophthalic anhydride, methylhexahydrophthalic acid anhydride, or methyl endomethylenehexahydrophthalic anhydride.

8. An epoxy impregnating resin composition, comprising:
   (a) 100 parts by weight of a compound having at least two epoxy groups in one molecule;
   (b) from 0.1 to 100 parts by weight of an allyl epoxy compound having both allyl and epoxy groups in one molecule and represented by the formula:

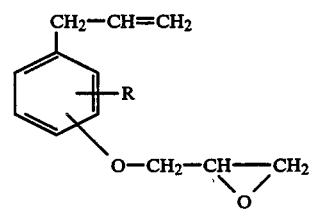

wherein R is hydrogen, halogen or a monovalent organic group;
   (c) from 30 to 300 parts by weight of a liquid cyclic acid anhydride selected from the group consisting of methyltetrahydrophthalic anhydride, methylhexahydrophthalic acid anhydride, and methyl endomethylenehexahydrophthalic anhydride;
   (d) from 0.1 to 10 parts by weight of a phenoxy resin having a molecular weight of from 10,000 to 50,000; and
   (e) from 5 to 300 parts by weight of at least one compound having three polymerizable double bonds selected from the group consisting of trimethylolpropane triacrylate, trihydroxyethylisocyanurate triacrylate, trihydroxyethylisocyanurate trimethacrylate, triallyltrimellitate and triallylisocyanurate.

* * * * *